(12) United States Patent
Bravo Perez

(10) Patent No.: US 10,284,877 B2
(45) Date of Patent: May 7, 2019

(54) VIDEO ENCODER

(71) Applicant: HEWLETT PACKARD ENTERPRISE DEVELOPMENT LP, Houston, TX (US)

(72) Inventor: Lorenzo Bravo Perez, Las Rozas (ES)

(73) Assignee: Hewlett Packard Enterprise Development LP, Houston, TX (US)

( * ) Notice: Subject to any disclaimer, the term of this patent is extended or adjusted under 35 U.S.C. 154(b) by 17 days.

(21) Appl. No.: 15/543,672

(22) PCT Filed: Jan. 16, 2015

(86) PCT No.: PCT/US2015/011688
§ 371 (c)(1),
(2) Date: Jul. 14, 2017

(87) PCT Pub. No.: WO2016/114788
PCT Pub. Date: Jul. 21, 2016

(65) Prior Publication Data
US 2018/0027259 A1    Jan. 25, 2018

(51) Int. Cl.
| | |
|---|---|
| *H04N 11/02* | (2006.01) |
| *H04N 19/80* | (2014.01) |
| *H04N 19/176* | (2014.01) |
| *H04N 19/132* | (2014.01) |
| *H04N 19/137* | (2014.01) |
| *H04N 19/507* | (2014.01) |
| *H04N 19/87* | (2014.01) |

(52) U.S. Cl.
CPC ........... *H04N 19/80* (2014.11); *H04N 19/132* (2014.11); *H04N 19/137* (2014.11); *H04N 19/176* (2014.11); *H04N 19/507* (2014.11); *H04N 19/87* (2014.11)

(58) Field of Classification Search
CPC ........................................ H04N 19/80
USPC ................................ 375/240.01–240.29
See application file for complete search history.

(56) References Cited

U.S. PATENT DOCUMENTS

| | | | |
|---|---|---|---|
| 5,103,488 A | | 4/1992 | Gemello et al. |
| 5,646,690 A | * | 7/1997 | Yoon ............... H04N 19/51 348/716 |

(Continued)

FOREIGN PATENT DOCUMENTS

| | | |
|---|---|---|
| CN | 102572380 A | 7/2012 |
| EP | 2698997 A1 | 2/2014 |

(Continued)

OTHER PUBLICATIONS

International Search Report and Written Opinion, International Application No. PCT/US2015/011688, dated Oct. 13, 2015, pp. 1-12, KIPO.

(Continued)

*Primary Examiner* — Leron Beck
(74) *Attorney, Agent, or Firm* — Hewlett Packard Enterprise Patent Department

(57) ABSTRACT

A video encoder may compare frames to generate a difference frames. The difference frame may be apportioned to generate a plurality of portions. Portions meeting a threshold pixel number condition are selected for compression. The threshold pixel number condition may measure the number of pixels which exceed an intensity threshold.

15 Claims, 6 Drawing Sheets

(56) References Cited

U.S. PATENT DOCUMENTS

| | | | |
|---|---|---|---|
| 5,768,533 A * | 6/1998 | Ran | H04N 7/141 348/E7.078 |
| 5,949,912 A * | 9/1999 | Wu | H04N 19/63 375/240.11 |
| 6,181,376 B1 * | 1/2001 | Rashkovskiy | G06T 3/4015 348/273 |
| 6,985,623 B2 | 1/2006 | Prakash et al. | |
| 8,396,127 B1 * | 3/2013 | Bultje | H04N 19/119 375/240.13 |
| 9,226,003 B2 | 12/2015 | Parm et al. | |
| 2001/0052131 A1 * | 12/2001 | Hobson | G07F 19/20 725/105 |
| 2001/0056230 A1 * | 12/2001 | Barak | G06T 19/006 600/407 |
| 2002/0012471 A1 * | 1/2002 | Nayyar | G06T 9/20 382/239 |
| 2002/0064306 A1 * | 5/2002 | Pilz | H04N 1/64 382/166 |
| 2004/0114054 A1 * | 6/2004 | Mansfield | G08B 13/19602 348/700 |
| 2005/0025361 A1 | 2/2005 | Gadre et al. | |
| 2005/0097052 A1 * | 5/2005 | Systa | G06F 21/10 705/51 |
| 2006/0050335 A1 * | 3/2006 | Dorrell | H04N 1/6086 358/516 |
| 2006/0093193 A1 * | 5/2006 | Viswanathan | G06K 9/00 382/128 |
| 2007/0011718 A1 * | 1/2007 | Nee, Jr. | H04N 7/16 725/135 |
| 2007/0074251 A1 * | 3/2007 | Oguz | H04N 19/105 725/45 |
| 2007/0290696 A1 * | 12/2007 | Majima | G01R 31/303 324/762.01 |
| 2008/0036917 A1 * | 2/2008 | Pascarella | G11B 27/11 348/702 |
| 2008/0037880 A1 * | 2/2008 | Lai | H04N 19/172 382/232 |
| 2009/0212112 A1 * | 8/2009 | Li | G06K 7/10 235/462.12 |
| 2011/0221960 A1 * | 9/2011 | Glaznev | H04N 21/2368 348/515 |
| 2011/0222787 A1 | 9/2011 | Thiemert et al. | |
| 2012/0215536 A1 | 8/2012 | Sehlstedt | |
| 2015/0265921 A1 * | 9/2015 | Curtis | A63F 13/86 463/31 |

FOREIGN PATENT DOCUMENTS

| | | |
|---|---|---|
| WO | WO-2013179101 A1 | 12/2013 |
| WO | WO-2014001381 A2 | 1/2014 |

OTHER PUBLICATIONS

Stretch Inc., "Intelligent Encoder SDK," Product Brief, MK-IESDK-0001-002, 2007, pp. 1-2.

Widen Enterprises, Inc., "Managing Video Content in DAM (Digital Asset Management)," Feb. 12, 2012, pp. 1-7.

* cited by examiner

VIDEO ENCODER

BACKGROUND

Some video surveillance systems, such as Internet protocol (IP) camera systems, can send and receive data via a computer network. In these systems, video captured by a video camera may be encoded and streamed over a network for live viewing, stored in a storage location such as on storage provided an Internet storage provider, or a combination thereof.

BRIEF DESCRIPTION OF THE DRAWINGS

Certain examples are described in the following detailed description and in reference to the drawings, in which.

DETAILED DESCRIPTION OF SPECIFIC EXAMPLES

Video surveillance systems may produce footage for extended periods of time. For example, video surveillance systems may record video constantly for days or even years at a time. Transmitting this footage over a network and storing this footage on a hosted system, such as a cloud system, may incur bandwidth and storage costs. Additionally, in a video surveillance system, a single encoder may receive video from multiple different video sources, such as different cameras. Encoding many different video streams may be computationally intensive. Furthermore, video surveillance footage may be subject to increased amount of noise, for example because of recording during the night or through the use of inexpensive cameras.

Implementations of the disclosed technology provide a video codec. The video coder may encode video that determines differences between two frames and encodes portions of a delta frame that have sufficient differences. A detection sensitivity may be used for measuring differences at the pixel level of the delta frame. This detection sensitivity may be configured according to a noise level of the video source. Additionally, the encoder may package encoded frames in a file-orientated manner rather than a streaming oriented manner. The encoded frame packages may include any metadata necessary to decode the frame, providing tolerance to frame loss and avoiding the need for a streaming architecture.

Figure 1:
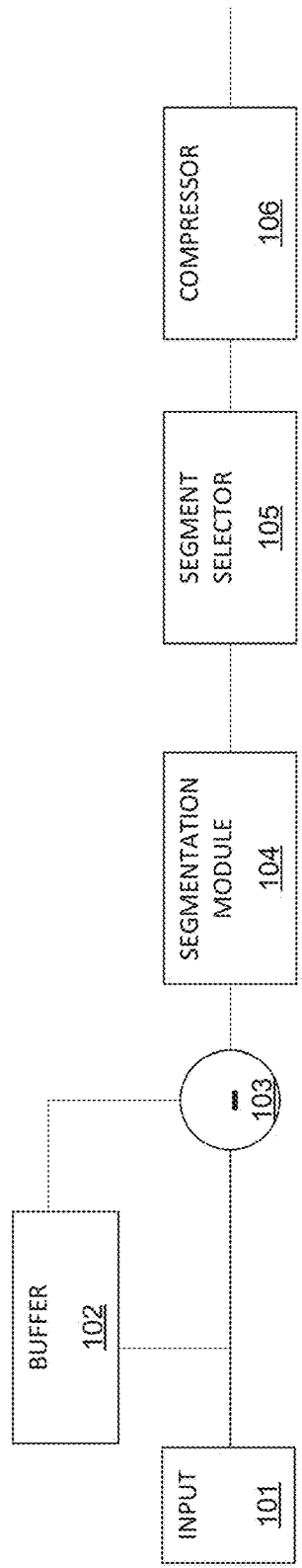
FIG. 1 illustrates an example encoder.

FIG. 1 illustrates an example encoder. In various implementations, the illustrated modules 101-106 may be implemented using hardware, software stored on a non-transitory computer readable medium and executed by a processing system, or a combination thereof.

The example encoder may include an input 101 to receive video frames. For example, the input 101 may be an interface to receive input video from a video source. For example, the input 101 may be an interface to provide a direct connection to a camera, a network interface to receive input video from an IP camera, an interface to connect to a storage to receive stored video footage, or other input video. In some implementations, the input video has multiple channels, such as red, green, and blue channels. In these implementations, the input may provide frames of the separate channels to the rest of the encoder.

The example encoder may also include a buffer 102. The buffer 102 may store a previous video frame to compare with a current video frame at a difference module 103. After providing the previous video frame to the difference module 103, the buffer 102 may store the current video frame for use in encoding the next video frame.

The example encoder may include the difference module 103. The difference module 103 may compare the previous frame with a current frame to generate a difference frame. For example, each pixel of the difference frame may be value of the current video frame at that pixel location minus the value of the previous video frame at that pixel location. Accordingly, the difference frame may reflect differences between the two frames due to changes in the scene, for example because of motion of objects in the scene or changes in lighting. The difference frame may also reflect differences between the two frames due to noise introduced by the video source.

The example encoder may also include a segmentation module 104. The segmentation module 104 may divide the difference frame into a plurality of segments. Each of the segments may be a plurality of pixels constituting a subset of the pixels of the difference frame. For example, the segmentation module 104 may divide the difference frame into a grid of blocks. For example, the module 104 may divide the difference frame into a 10×10 grid of 100 equal sized blocks. In some implementations, the number of segments may be provided during set-up of the encoder for the video source. For example, increasing the number of segments may improve video quality at the expense of decreased compression ratio and increased computational requirements.

The example encoder 105 may include a segment selector 105. The segment selector 105 may select which segments demonstrate a sufficient difference between the two frames to be encoded. Non-encoded segments may be discarded. For each segment, the segment selector 105 may compare each pixel of the segment to an intensity threshold. Pixels having values exceeding the intensity threshold may be regarded as likely representing a scene change between the current frame and the previous frame. Pixels having values less than the intensity threshold may be regarded as likely representing the result of noise. In some implementations, the intensity threshold may be a function of a noise value of a camera capturing the video frames. For example, the intensity threshold may be function of the mean noise intensity of the camera.

For each segment, the segment selector 105 may count having a number of pixels exceeding the intensity threshold that meets a threshold condition. For example, the threshold condition may whether a count of the number of pixels greater than the intensity threshold exceeds a threshold percentage. If the threshold condition is met, the segment may be selected for compression. For example, the threshold condition may be a threshold number between 25% and 35% of the number of pixels in the segment. In some implementations, the threshold condition may be provided as a percentage or a raw number as a parameter passed to the system or provided by an administrator. Accordingly, the segment selector may cause the encoder to skip segments having an insufficient amount of change to warrant compression. For example, slight changes due to small scene changes or slowly varying lighting changes may be ignored by the encoder.

The system may also include a compressor 106. The compressor 106 may compress each selected segment using an intra-coding compression method. For example, the intra-coding compression method may use only information contained within the segment being compressed. In various implementations, a variety of lossless or lossy image compression techniques may be used as the intra-coding compression method. For example, compressor 106 may apply JPEG compression to the segment to produce a compressed segment. In some implementations, the compressor 106 may use default coding parameters for the intra-coding compression method. In other implementations, coding parameters for the compressor 106 may be provided to the system to configure the compression for the video being compressed.

In some implementations, each compressed segment may be kept as a separate file, such as a separate *.jpg file. In these implementations, the compressor 106 may compress the set of compressed selected segments using an archive file compression method to produce a compressed inter-frame file. For example, the compressor 106 may use a compression method such as DEFLATE and produce a *.zip file as the inter-frame file.

The compressor 106 may include additional information in the inter-frame file. For example, the compressor 106 may include information needed to decode the inter-frame in the file. For example, the compressor 106 may include metadata about the location of each of the compressed segments in the file, resolution of the video, frame rate, decoding parameters, video identification, which player to use, or other decoding information.

During decoding, the decoder may decompress the inter-frame files, and apply the decoded difference segments to the last processed frame. If compressed inter-frames are lost, the last processed frame may be different from the frame used to generate the inter-frame being decompressed. In implementations utilizing key frames, as discussed below, frame loss of any frames following the last received key frame may be ignored by the decoder.

Figure 2:
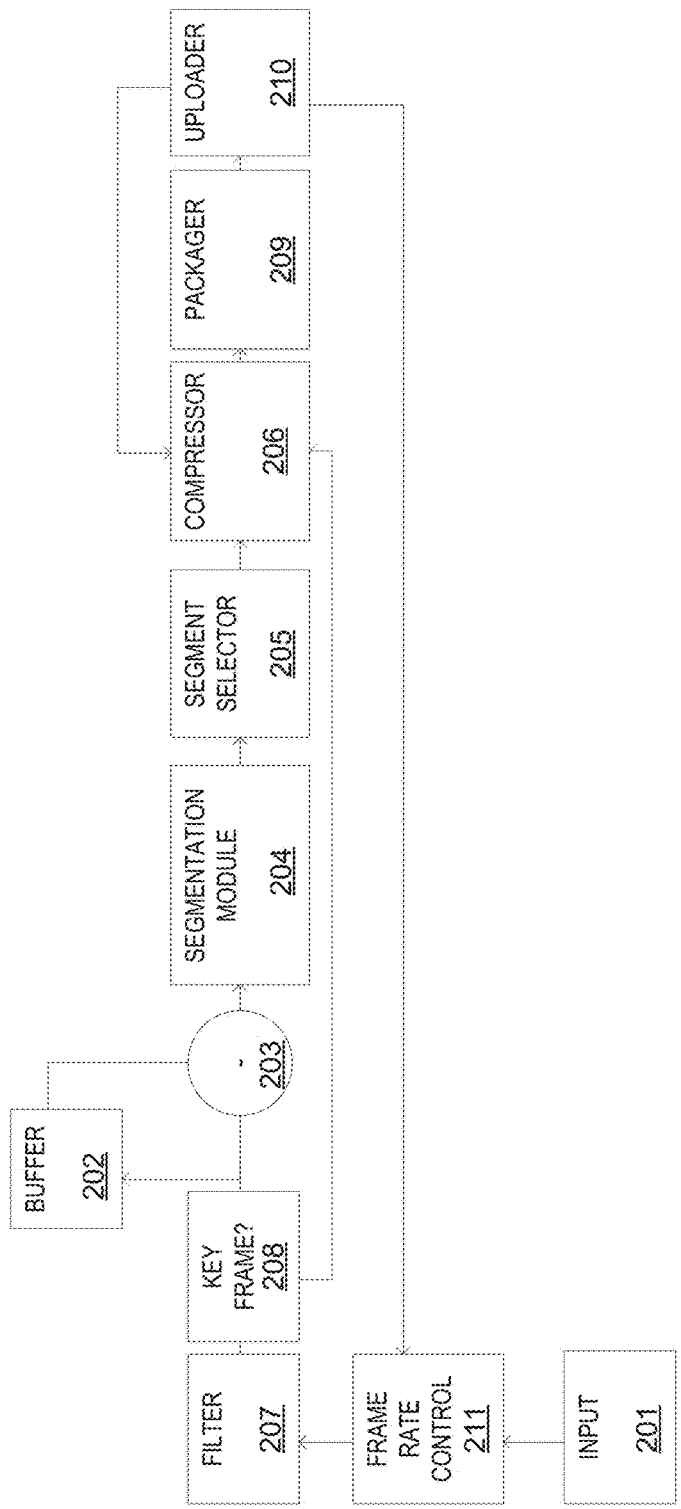
FIG. 2 illustrates another example encoding system.

FIG. 2 illustrates another example encoding system. In various implementations, the illustrated modules 201-210 may be implemented using hardware, software stored on a non-transitory computer readable medium and executed by a processing system, or a combination thereof.

The illustrated system may include an input 201, buffer 202, difference module 203, segmentation module 204, segment selector 205, and compressor 206. These modules may operate as described with respect to input 101, buffer 102, difference module 103, segmentation module 104, segment selector 105 and compressor 106 of FIG. 1.

Additionally, the illustrated system may include a frame rate controller 211. In some cases, different video sources may have their own frame rate configurations. For example, a USB computer camera could have a frame rate of 30 FPS while an IP camera could have a frame rate of 10 FPS. The frame frequency controller 211. The frame rate controller 211 may discard video frames to achieve at most a target frame rate. For example, the frame rate controller 211 may monitor the frame rate of the video received through the input 201 and discard frames to achieve the target frame in a homogenous manner during a certain time period, such as a second. In some implementations, the desired frame rate may be obtained as a coding parameter during system initialization. Additionally, as described below, the uploader 210 may modify the target frame rate to work within bandwidth limitations.

Additionally, the system may include a filter module 207. The filter module 207 may receive the video frames from the input and apply a filter to the video frames. The filter module 207 may then provide the filtered video frames to the difference module. In some implementations, the filter module 207 may apply the filters to normalize the video frames prior to analysis In implementations where each channel is separately encoded, the filter module 207 may apply filters to the combined image of all channels, or to the separate color channels individually.

In some implementations, the filter module 207 may apply a brightness filter to brighten the images to normalize the histograms of the video frames. For example, the filter module 107 may brighten or darken images as needed to achieve a predetermined mean histogram value. In some implementations, the filter module 207 may apply a smoothing filter to smooth the images prior to noise thresholding. The smoothing filter may reduce the effects of noise on the images by decreasing the intensity difference between co-located pixels at successive frames. Additionally, the smoothing filter may reduce the intensity differences within a frame, which may reduce the number of segments selected by the segment selector 205.

In some implementations, the system may have multiple operational modes to encode the video. For example, the system may operate in a day mode or a night mode depending on the brightness of the video. For example, the filter module 207, input 201, or other module may make the determination of which mode to enter. For example, the system may inspect histograms of video frames to determine an average amount of light in the scene. This may allow the system to adapt to unexpected condition changes. For example, by allowing the system to enter night mode during in cloudy weather or when the scene is in shadow. In other implementations, the system may enter different modes based on time of day or outside control signals. In implementations with multiple operational modes, various encoding settings may be adjusted based on the current operational mode. For example, the amount of smoothing applied by the filter module 207 may be lower in a dark mode than in a light mode.

The system may further include a key frame selector 208. The key frame selector 208 may select frames that will be key frames. Key frames may be provided to the compressor 206 for encoding without comparison to previous frames. In some implementations, key frames may occur at the first video frame of the video as well as at a key frame rate. For example, a key frame may occur every 15 frames in the encoded video. In some cases, the key frame rate may be provided to the system as a coding parameter. In these cases, the key frame rate may be included in the frame metadata by the compressor 206.

The compressor 206 may compress a key frame may be compressed with an intra-coding compression method. For example, the compressor 206 may apply the same coding method used to compress segments selected by selector 205. For example, the compressor 206 may apply JPEG compression to the key frame to produce a compressed key frame. The compressor 206 may then compress the compressed key frame along with applicable metadata using an archival compression method. For example, the compressor 206 may compress the key frame along with metadata in a *.zip file. In some cases, the metadata may include all parameters needed to decode the file. For example, the metadata may include an indication that the frame is a key frame, resolution, frame number, frame rate, and other parameters.

In some implementations, the compressor 206 may compress key frames or selected frame segments according to image quality parameter. For example, the compressor 206 may apply JPEG compression using a Q value between 1 and 100. A default image quality parameter may be provided to the compressor 206 as a system set parameter or as a user-selectable coding parameter during system initialization. Additionally, in some implementations, the compressor 206 may receive a modified image quality parameter from the uploader 210 to allow the system to work within bandwidth restrictions.

The system 209 may further include a packager 209. The packager 209 may package multiple compressed frames into a video clip package. for example, the packager 209 may package sufficient frames to achieve a set package size or a set video clip length. For example, the packager 209 may assemble a 256 KB or 10" video clip into a packaged file. As another example, the packager 209 may package a key frame and the inter-frames between the key frame and the next key frame.

The system may also include an uploader 210. The uploader may send the packages to a network location for retrieval by a decoder. For example, the uploader may send the packages to a cloud storage site. In some implementations, the uploader 210 may utilize available application programming interfaces (APIs) to send the packagers to a publicly hosted cloud storage location. Accordingly, the video may be transmitted using standard file transmission protocols and architectures rather than using streaming-specific protocols and architectures. In some implementations, the uploader 210 may discard packages if a connection to the network location is lost. Including the metadata in the files may allow arbitrary amount of frame loss, because the receiver may retrieve all information necessary to decode the frame from each received file.

In some implementations, the uploader 210 may provide feedback to the frame rate controller 211 or compressor 206 to adapt the video bitrate according to available bandwidth constraints. For example, the uploader 210 may act as a network monitor and may adapt the video bitrate to attempt to achieve a desired video bitrate reflecting a desired frame rate and desired image quality, such as Q=80. If the available upload bandwidth is insufficient to achieve the desired bitrate, the uploader 210 may reduce the video bitrate until the bitrate is less than then the upload bitrate. If the available bandwidth later increases, the uploader 210 may increase the bitrate until the bitrate meets the available bandwidth or the desired bitrate is met. For example, the uploader 210 may compare a currently available network bandwidth to an upload rate required to upload the video at its current bitrate. If the current bandwidth is insufficient to achieve the required upload rate, the uploader 210 may decrease the target frame rate used by the frame rate controller 211 or may decrease the image quality of the compressor 206 until the available bandwidth is sufficient to meet the upload rate required to transmit the video.

In some implementations, the uploader 210 may first decrease the image quality until a minimum quality is reached. After the minimum quality is reached, the uploader 201 may decrease the target frame rate until a minimum frame rate is reached. In some cases, the uploader 210 may iteratively monitor the currently available bandwidth. For example, the uploader 210 may monitor the currently available upload bandwidth each time it uploads a package. At each iteration, the uploader 210 may decrease an image quality parameter of the intra-coding compression method if the current bandwidth is insufficient to achieve the required upload rate and the image quality parameter is greater than a minimum quality. For example, the uploader 210 may decrease the image quality parameter, such as a Q value for JPEG compression by 1 at each iteration until a minimum value, such as Q=20, is met. Alternatively, at each iteration the uploader 210 may decrease the target frame rate if the current bandwidth is insufficient to achieve the target upload rate and the image quality parameter is less than or equal to the minimum quality. For example, the uploader 210 may decrease the frame rate by 1 frame per second at each iteration. If the available bandwidth increase, the uploader 210 may reverse the process, iteratively increasing the frame rate until the frame rate is at a desired frame rate, and then increasing the image quality until the image quality is at a desired quality level.

Figure 3:
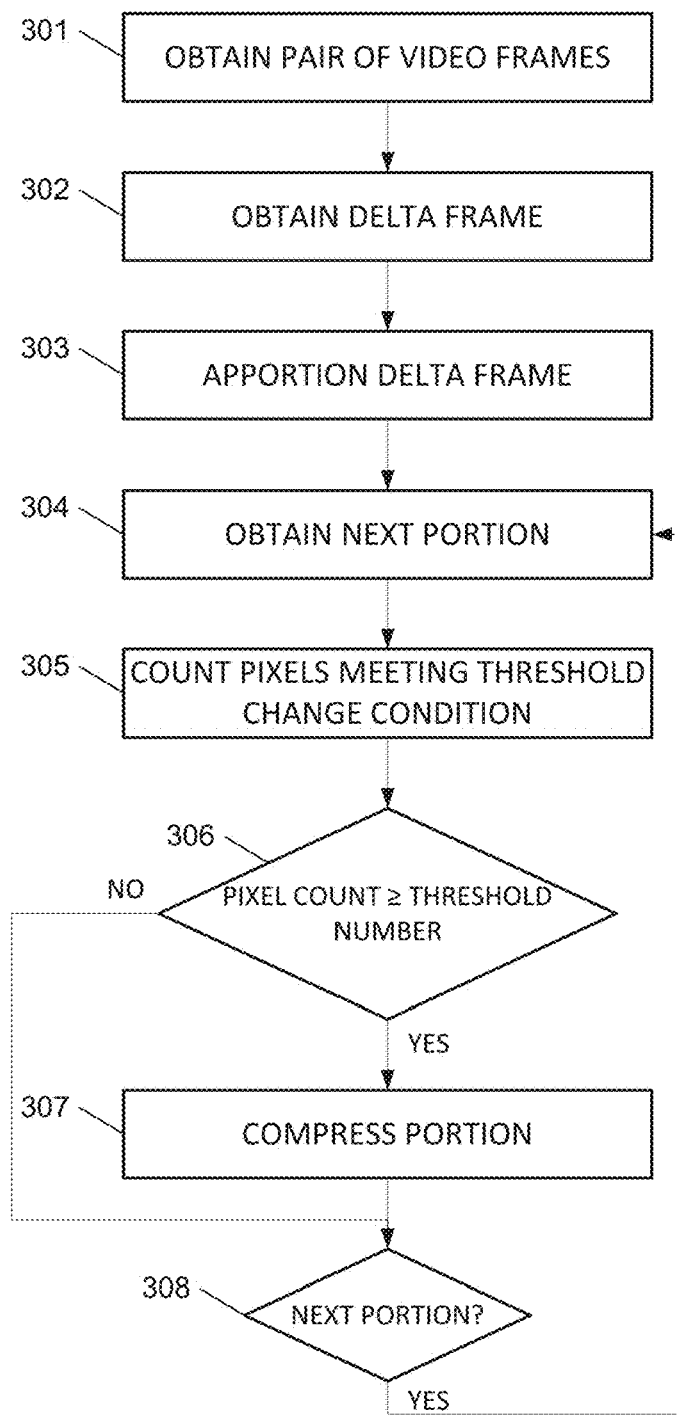
FIG. 3 illustrates an example method of encoding video.

FIG. 3 illustrates an example method of encoding video. For example, the illustrated method may be performed by a video encoder, such as the encoder illustrated in FIG. 1 or 2.

The method may include block 301. Block 301 may include obtaining a pair of video frames. For example, block 301 may include obtaining a pair of video frames from a video source. In some implementations, the video frames are frames in a single channel. For example, the pair of frames are successive frames in a red, green, or blue video channel. In other implementations, such as for black-and-white video, only a single channel is present. For example, the video source may be a live video source, such as a video camera, or a stored video source, such as a storage system storing recorded video. As another example, block 301 may include obtaining a pair of frames after filtering the frames or discarding frames to achieve a desired frame rate. In some implementations, block 301 may be performed as described with respect to the operation of input 101 of FIG. 1 or input 201 of FIG. 2.

The method may also include block 302. Block 302 may include obtaining a delta frame by comparing the pair of video frames. In implementations performing coding on each channel separately, the delta frame may be generated by comparing the pair of video frames of a channel. In some implementations, block 302 may be performed as described with respect to the operation of difference module 103 of FIG. 1 or difference module 203 of FIG. 2. For example, block 302 may be performed by subtracting the intensity value of the successive pixels at each pixel location of the pair of frames. In some implementations, block 302 may include discarding or disregarding delta pixels that have an intensity below a threshold. For example, these pixels may represent locations where change between frames is likely a result of noise rather than scene change. In other implementations, block 302 includes obtaining a raw delta frame reflecting the intensity difference at each pixel location. In these implementations, thresholding at the pixel level may be performed later in the method.

The method may also include block 303. Block 303 may include apportioning the delta frame into a set of portions, with each portion comprising a set of pixels of the delta frame. For example, block 303 may be performed as described with respect to the operation of segmentation module 104 of FIG. 1 or segmentation module 204 of FIG. 2. For example, block 303 may include blocking the delta frame into a grid of blocks.

The method may also include block 304. Block 304 may include obtaining a first or next portion of the delta frame. For each portion of the set of portions, the method may include performing blocks 305 and 306. For example, these blocks may be performed as described with respect to the operation of segment selector 105 of FIG. 1 or segment selector 205 of FIG. 2.

Block 305 may include counting a number of the pixels of the set of pixels of the portion that meet a threshold change condition. For example, if obtaining the delta frame in block 302 includes discarding pixels that are within a threshold intensity difference of each other, then block 305 may include counting the number of pixels with non-zero intensity. As another example, block 305 may include counting the number of pixels in the portion that have a threshold intensity.

Block 306 may include determining if the number of pixels that meet the threshold change condition is at least a threshold number. For example, the threshold number may be a percentage of the number of pixels in the portion, such as a percentage greater than or equal to 25% and less than or equal to 35%. In other implementations, the threshold number may be a set number that does not depend on the number of pixels in the portion.

Block 307 may be performed if the number of pixels that meet the threshold change condition is at least the threshold number. In block 307, the current portion is compressed. In some cases, block 307 may be performed as described with respect to the compressor 106 of FIG. 1 or compressor 206 of FIG. 2. For example, block 307 may include performing a JPEG compression on the portion to create a compressed image file corresponding to the portion.

The example method may also include block 308. In block 308, the system may determine if another portion remains to be evaluated and possibly compressed. If so, the method returns to and repeats from block 304.

Figure 4:
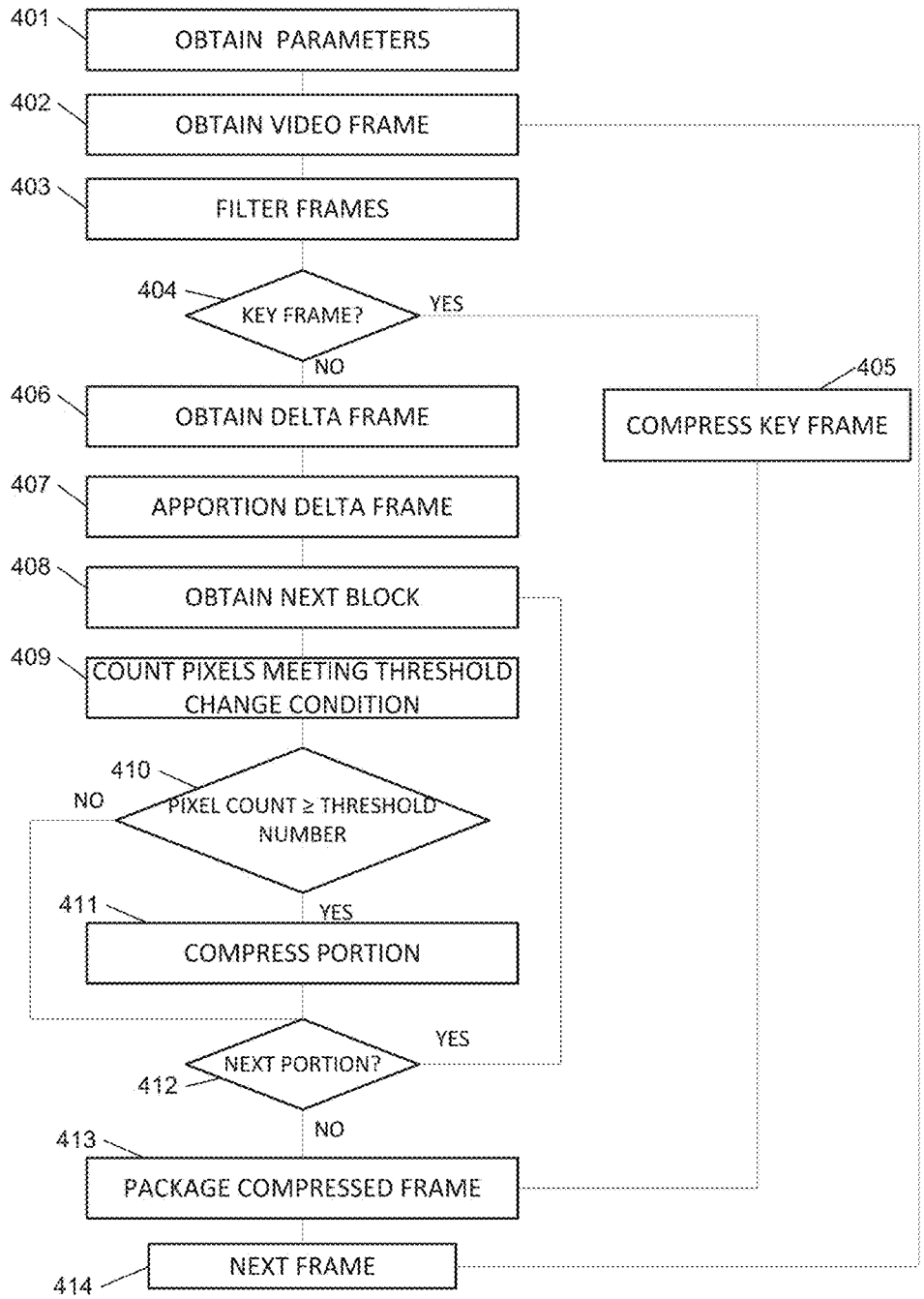
FIG. 4 illustrates a method of encoding video and packaging the encoded video.

FIG. 4 illustrates a method of encoding video and packaging the encoded video. For example, the illustrated method may be performed by a video encoder, such as the encoder of FIG. 1 or FIG. 2.

The method may include block 401. Block 401 may include obtaining various coding parameters. For example, the parameters may be received through a user interface or obtained from data storage or hardware such as a video camera. For example, block 401 may include receiving a noise level for a video source. For example, an average noise level may be obtained directly from the camera, by evaluating video frames from the camera, or from a database storing the information. As another example, block 401 may include receiving a grid parameter defining how many blocks the frame will be divided into in block 407. As another example, block 401 may include receiving a key frame frequency.

In some implementations, other parameters may be obtained by evaluating video received from a video source. For example, a histogram of the video images may be evaluated to determine the lighting level of the scene. In this example, the lighting level may be used as a parameter to select a coding mode, such as a day mode or night mode. Depending on the coding mode, various coding settings may be used.

The method may include block 402. Block 402 may include obtaining input video, including a pair of video frames. In some implementations, block 402 may be performed as described with respect to block 301 of FIG. 3. For example, the video received from a video source may have red, green, and blue channels, and a separate pair of video frames may be obtained for each channel. Each separate pair may be separately encoded. In some implementations, block 402 may further include controlling the frame rate of the input video. For example, block 402 may also include performing the operations described with respect to the frame rate controller 211 of FIG. 2. In some cases, block 402 may include obtaining a frame rate from a network monitor to control the bitrate of the video to meet bandwidth constraints.

The method may also include block 403. Block 403 may include filtering the video frames. In some implementations, block 403 may be performed as described with respect to the operation of filter 207 of FIG. 2. For example, block 403 may include applying a smoothing filter or a brightness filter to each of the pair of video frames. In some cases, the filtering may vary depending on a coding mode that is being used to encode the video. For example, a greater amount of smoothing may be applied during a light mode than in a dark mode.

The example method may also include block 404. Block 404 may include determining whether the current frame should be used as a key frame or not. In some implementations, block 404 may be performed as described with respect to the operation of key frame module 208 of FIG. 2. For example, block 404 may include counting the frames and creating a key frame as determined by a key frame frequency. For example, the key frame frequency may be obtained in block 401. In some implementations, the key frame frequency may be greater than or equal to 10 and less than or equal to 40. If block 404 determines that the current frame should be key frame encoded, the method proceeds to block 405.

In block 405, the key frame may be compressed without comparison to previous frames. For example, the key frame may be compressed using a JPEG compression technique. In some implementations, block 405 may include receiving a quality parameter from a network monitor to adapt the video bitrate to meet bandwidth constraints. The method may then proceed to block 413.

If block 404 determines that the current frame should not be key frame encoded, then the method proceeds to block 406 for difference encoding. Block 406 may include obtaining a delta frame. For example, block 406 may be performed as described with respect to block 302 of FIG. 3. In multi-channel video, block 406 may include obtaining a red channel delta frame, a green channel delta frame, and a blue channel delta frame.

The example method may also include block 407. Block 407 may include apportioning the delta frame into a set of portions. For example, block 407 may be performed as described with respect to block 303 of FIG. 3. In some implementations, the portions are blocks equal to the grid parameter received in block 401.

The example method may also include block 408. Block 408 may include obtaining a first or next block of the divided delta frame. For example, block 408 may be performed as described respect to block 304 of FIG. 3.

The example method may also include block 409. Block 409 may include counting a number of the pixels of the set of pixels of the portion that meet a threshold change condition. For example, block 409 may be performed as described with respect to block 305 of FIG. 3.

The example method may also include block 410. Block 410 may include determining if the number of pixels that meet the threshold change condition is at least a threshold number. For example, block 410 may be performed as described with respect to block 306 of FIG. 3. If the number of pixels meeting the threshold condition is less than the threshold number, the method may proceed to block 412. Otherwise, the method may proceed to block 411. Block 411 may include compressing the portion. For example, block 411 may be performed as described with respect to block 307 of FIG. 3. In some implementations, block 411 may include receiving a quality parameter from a network monitor to adapt the video bitrate to meet bandwidth constraints.

The method may also include block 412. In block 412, the system may determine if remaining blocks exist in the delta frame being encoded. If so, the method may repeat from block 408. If not, the method may proceed to block 413.

Block 413 may include packaging any compressed portions of the set of portions into an interframe package. Additionally, block 413 may include packaging a compressed key frame into a key frame package. In some implementations, block 413 may be performed as described with respect to the operation of packager 209 of FIG. 2. For example, block 413 may further include including metadata in the frame, the metadata describing locations of the compressed portions for a reconstructed frame.

Figure 5:
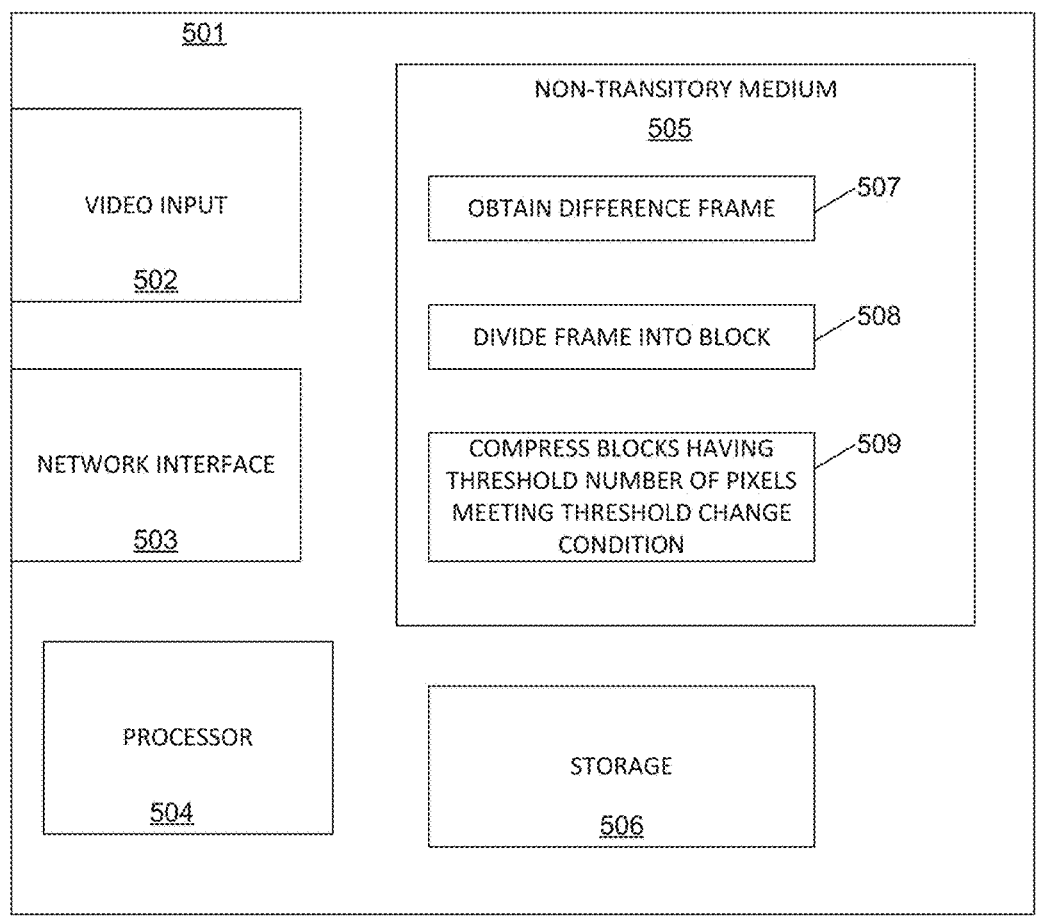
FIG. 5 illustrates an example coding system including a non-transitory computer readable medium storing instructions executable by a processor to encode video.

FIG. 5 illustrates an example coding system 501 including a non-transitory computer readable medium 505 storing instructions executable by a processor 504 to encode video. For example, the non-transitory computer readable medium 505 may include memory, storage, or a combination thereof. In some implementations, the example system 501 may be an implementation of the systems illustrated in FIGS. 1 and 2 and may perform the methods illustrated in FIGS. 3 and 4.

The medium 505 may store a first instruction set 507. The first instruction set 507 may be executable by the processor 504 to obtain a difference frame. The difference frame may comprise a difference between a first video frame and a second video frame. For example, the processor 504 may execute the instructions 507 to obtain the video frames from a video input 502 or a network interface 503. The processor 504 may then execute the instructions 507 to subtract the later video frame from the previous vide frame to obtain the difference frame.

The medium 505 may store a second instruction set 508. The second instruction set 508 may be executable by the processor 504 to divide the difference frame into blocks, each block comprising a set of pixels. In some implementations, the instruction set 508 may be executable by the processor 504 to obtain the number of blocks as an input parameter.

The medium 505 may store a third instruction set 509. The third instruction set 509 may be executable by the processor 504 to compress any of the blocks having a threshold number of pixels that meet an intensity threshold determined from a noise level of a source of the first and second video frames. For example, the instructions 508 may be executable by the processor 504 to obtain the noise level as an input parameter, from a storage 506, or by analyzing the video received at the video input 502. In some implementations, the instruction set 509 may be further executable by the processor 504 to package the compressed blocks into interframe packages. As described above, the interframe packages may include metadata usable by a decoder to decode the difference frame and apply the difference frame to a previously decoded frame. In some implementations, the instruction set 509 may be executable by the processor 504 to store the compressed blocks, separately or as packages, in storage 506 or to transmit them over the network interface 503 to a network location.

Figure 6:
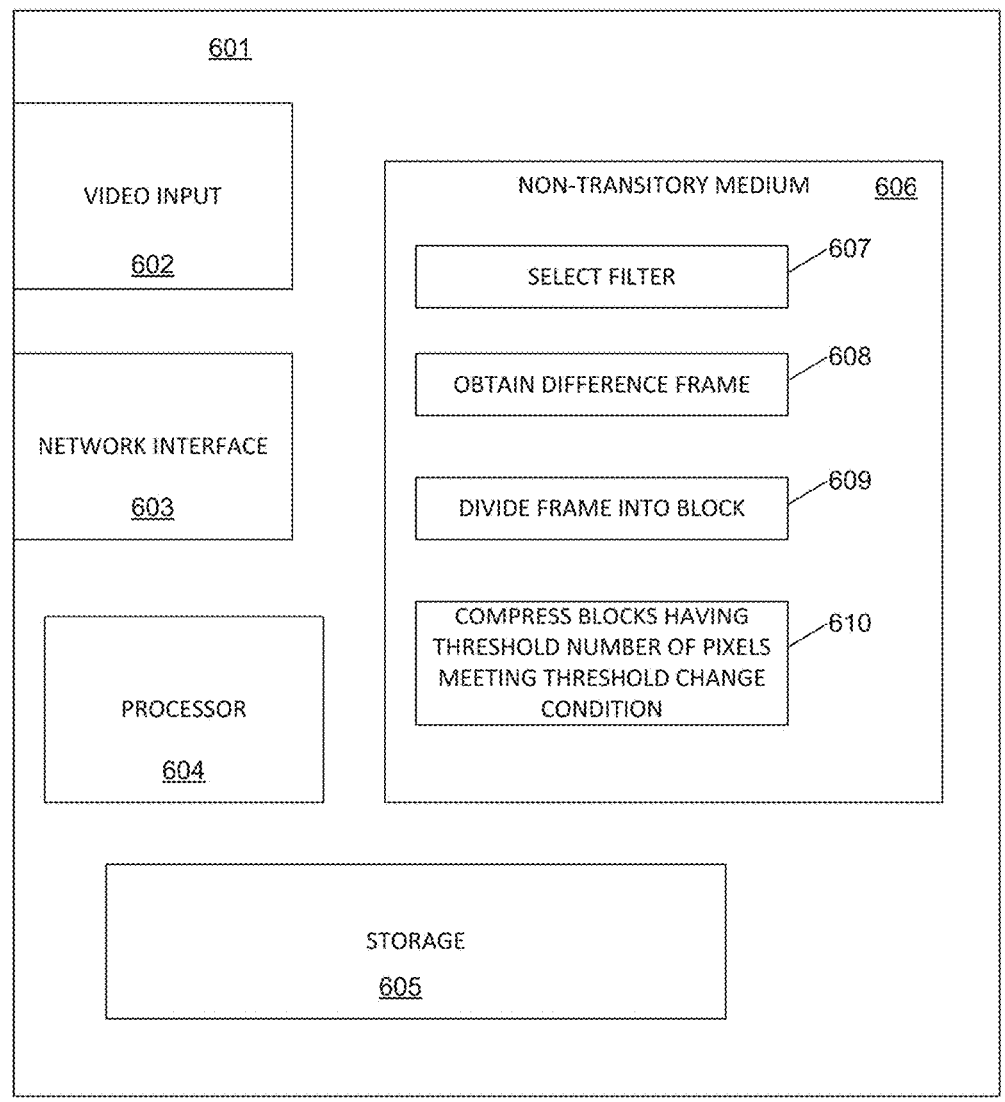
FIG. 6 illustrates an example coding system including a non-transitory computer readable medium storing instructions executable by a processor to apply video filters and encode video.

FIG. 6 illustrates an example coding system 601 including a non-transitory computer readable medium 606 storing instructions executable by a processor 604 to apply video filters and encode video. For example, the non-transitory computer readable medium 606 may include memory, storage, or a combination thereof. In some implementations, the example system 601 may be an implementation of the systems illustrated in FIGS. 1 and 2 and may perform the methods illustrated in FIGS. 3 and 4.

The example system may include a first instruction set 607. The first instruction set 607 may be executable by the processor 604 to select a filter according to a brightness measurement of at least one of video frame. For example, the system may receive video to be encoded via a video input 602. The processor 604 may evaluate frames of the video to measure the brightness of the frames. The system may determine a filter to be applied to the video. For example, the instructions 607 may be executable to cause the system to enter a dark mode for video with a brightness under a threshold and a light mode for brightness over a threshold. The instructions 607 may be further executed to apply a filter based on the coding mode. For example, a first smoothing amount may be applied in the dark mode and a second smoothing amount, greater than the first, may be applied in the light mode.

The example system may also include instruction sets 608-610. These instructions may be executed as described with respect to instructions 507-509 of FIG. 5, respectively.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. An encoder, comprising:
   an input to receive video comprising video frames;
   a difference module to compare a previous frame with a current frame to generate a difference frame;
   a segmentation module to segment the difference frame into a plurality of segments, each segment comprising a plurality of pixels;
   a segment selector to select segments of the plurality of segments having a number of pixels exceeding an intensity threshold that meets a threshold condition;
   a compressor to compress each selected segment using an intra-coding compression method;
   a frame rate controller to discard frames of the video to achieve at most a target frame rate; and
   a network monitor to:
      compare a currently available network bandwidth to a required upload rate;
      decrease an image quality parameter of the intra-coding compression method if the current bandwidth is insufficient to achieve the required upload rate and the image quality parameter is greater than a minimum quality; and
      decrease the target frame rate if the current bandwidth is insufficient to achieve the required upload rate and the image quality parameter is less than or equal to the minimum quality.

2. The encoder of claim 1, wherein the intensity threshold is a function of a noise value of a camera capturing the video frames.

3. The encoder of claim 1, wherein the compressor is to compress the set of compressed selected segments using an archive file compression method to produce a compressed inter-frame file.

4. The encoder of claim 2, wherein the compressor is to include metadata in the compressed inter-frame file, the metadata indicating the location of each of the compressed selected segments in the different frame.

5. The encoder of claim 1, further comprising:
a filter module to receive the video frames from the input, to apply a filter to the video frames and provide the filtered video frames to the difference module.

6. The encoder of claim 1, further comprising:
a packager to receive a set of compressed inter-frame files from the compressor and to package the set of compressed inter-frame files into a compressed video clip.

7. A method, comprising
discarding video frames to achieve at most a target frame rate;
obtaining a pair of video frames;
obtaining a delta frame by comparing the pair of video frames;
apportioning the delta frame into a set of portions, each portion comprising a set of pixels;
for each portion of the set of portions:
counting a number of the pixels of the set of pixels of the portion that meet a threshold change condition; and
if the number of pixels that meet the threshold change condition is at least a threshold number, compressing the portion using intra-coding compression having an image quality parameter;
comparing a currently available network bandwidth to a required upload rate;
decreasing the image quality parameter if the currently available network bandwidth is insufficient to achieve the required upload rate and the image quality parameter is greater than a minimum quality; and
decreasing the target frame rate if the current bandwidth is insufficient to achieve the required upload rate and the image quality parameter is less than or equal to the minimum quality.

8. The method of claim 7, further comprising:
packaging any compressed portions of the set of portions into an interframe package; and
including metadata in the frame, the metadata describing locations of the compressed portions in a reconstructed frame.

9. The method of claim 7, further comprising:
receiving a noise level for a source of the video frames; and
determining the threshold change condition from the noise level.

10. The method of claim 7, further comprising applying a smoothing filter or a brightness filter to each of the frames of the pair of video frames prior to obtaining the delta frame.

11. The method of claim 7, wherein the pair of video frames have red, green, and blue channels, and further comprising:
obtaining a red channel delta frame, a green channel delta frame, and a blue channel delta frame, the delta frame being one of the red channel delta frame, the green channel delta frame, or the blue channel delta frame.

12. A non-transitory computer readable medium, storing instructions executable by a processor to:
discard video frames to achieve at most a target frame rate;
obtain a difference frame comprising a difference between a first video frame and a second video frame;
divide the difference frame into blocks, each block comprising a set of pixels; and
compress any of the blocks having a threshold number of pixels that meet an intensity threshold using intra-coding compression method having an image quality parameter;
compare a currently available network bandwidth to a required upload rate;
decrease the image quality parameter if the current bandwidth is insufficient to achieve the required upload rate and the image quality parameter is greater than a minimum quality; and
decrease the target frame rate if the current bandwidth is insufficient to achieve the required upload rate and the image quality parameter is less than or equal to the minimum quality.

13. The non-transitory computer readable medium of claim 12, further comprising instructions executable by the processor to:
select a filter according to a brightness measurement of at least one of the video frames; and
apply the filter to the video frames prior to obtaining the difference frame.

14. The non-transitory computer readable medium of claim 12, wherein the intensity threshold is determined from a noise level of a source of the first and second video frames.

15. The non-transitory computer readable medium of claim 12, further comprising instructions executable by the processor to:
compress the set of compressed blocks using an archive file compression method to produce a compressed inter-frame file.

* * * * *